213. Railway Draft Appliances.
22
A. H. ROWAND.
Car Bumper.
No. 315. A. I. Patented Feb. 26, 1861.
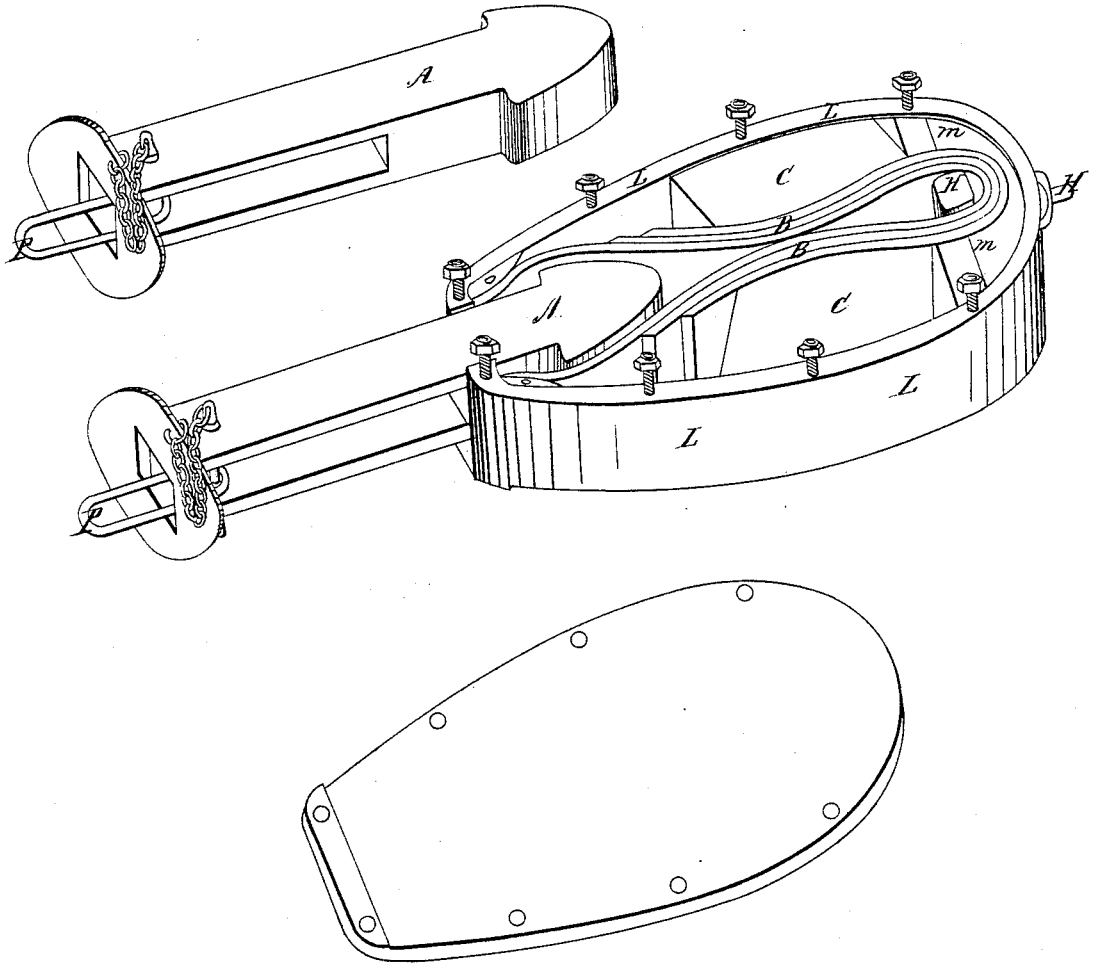
Witnesses:
Weston Rowand.
Jacob Ma Wunder.
Inventor:
A. H. Rowand.
AM. PHOTO-LITHO.CO. N.Y. (OSBORNE'S PROCESS.)